Feb. 6, 1923.

H. N. COPP.
SHOE REPAIR PLANT.
FILED AUG. 24, 1917.

INVENTOR:
Harry N. Copp

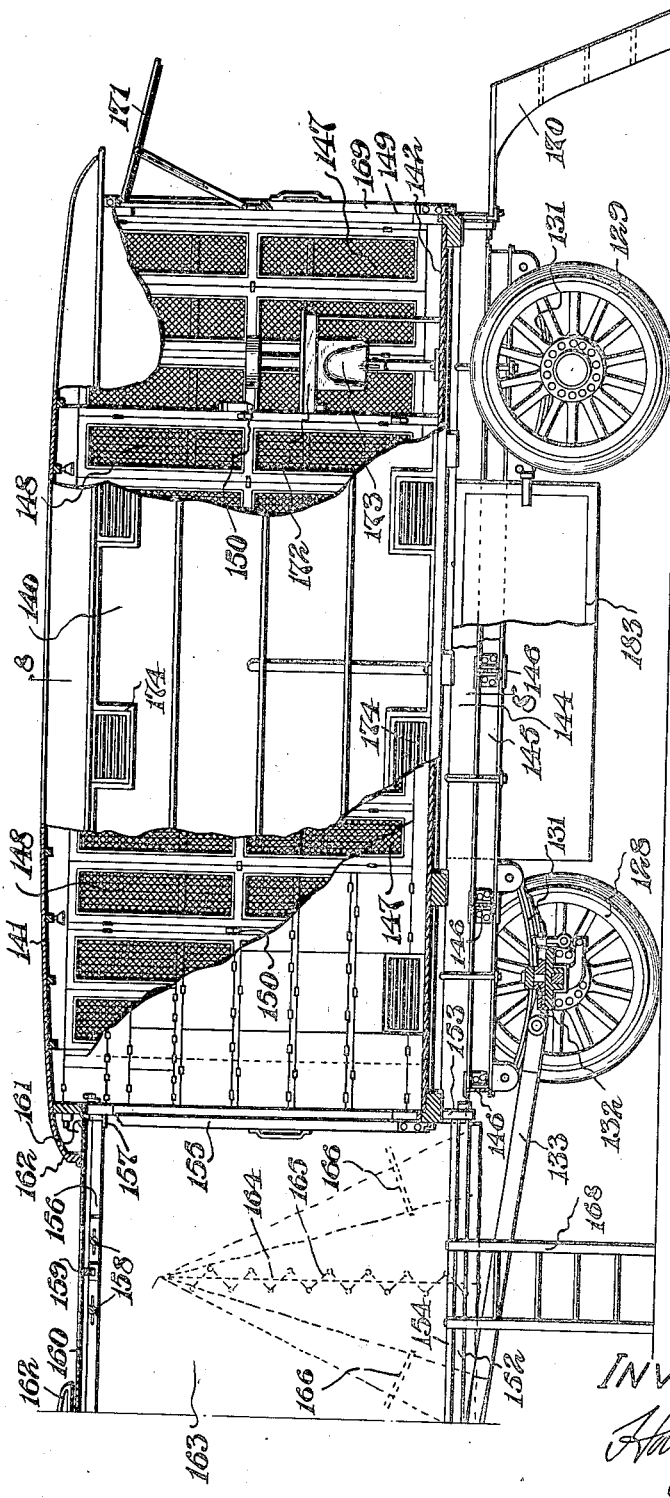

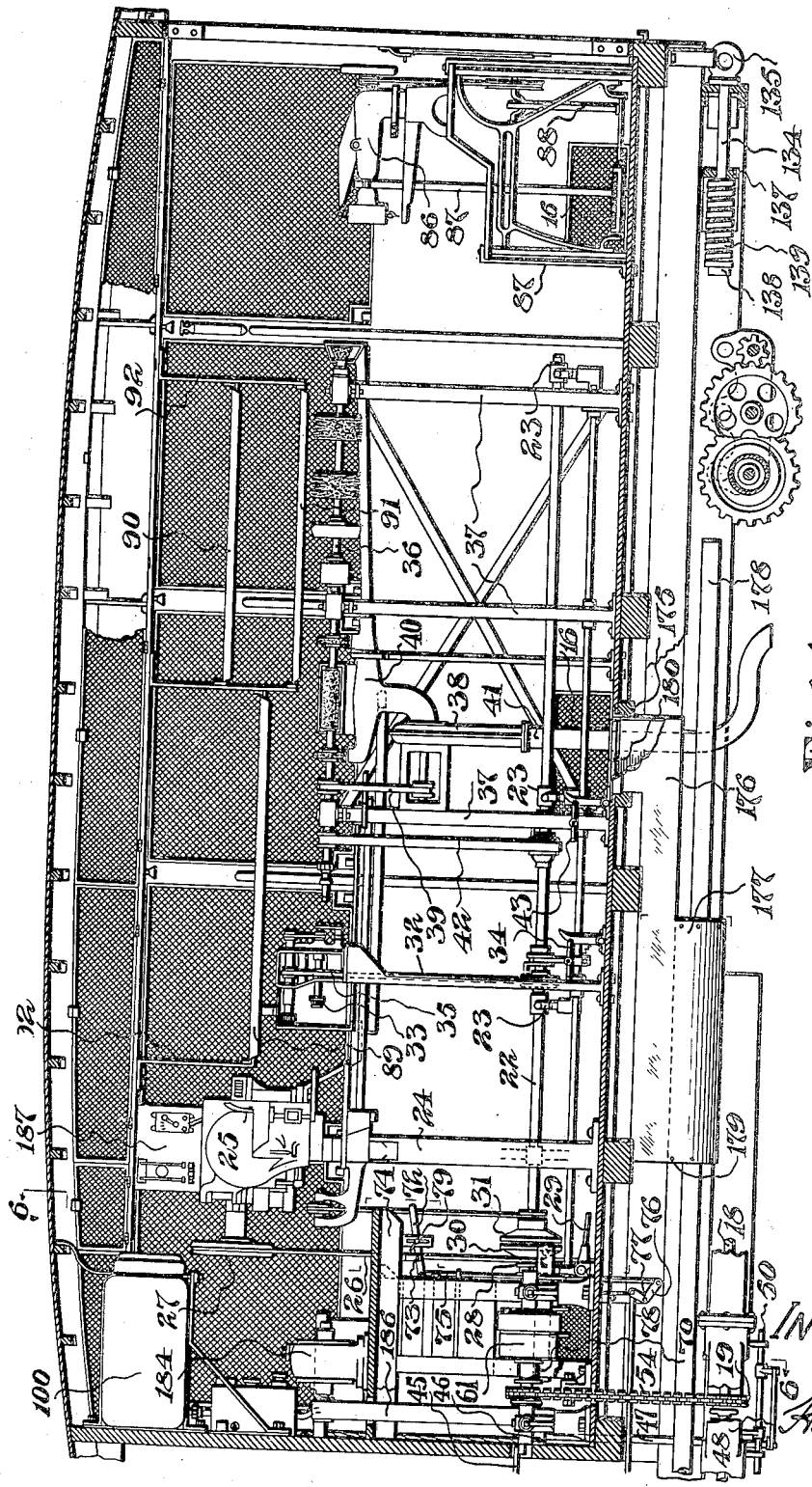

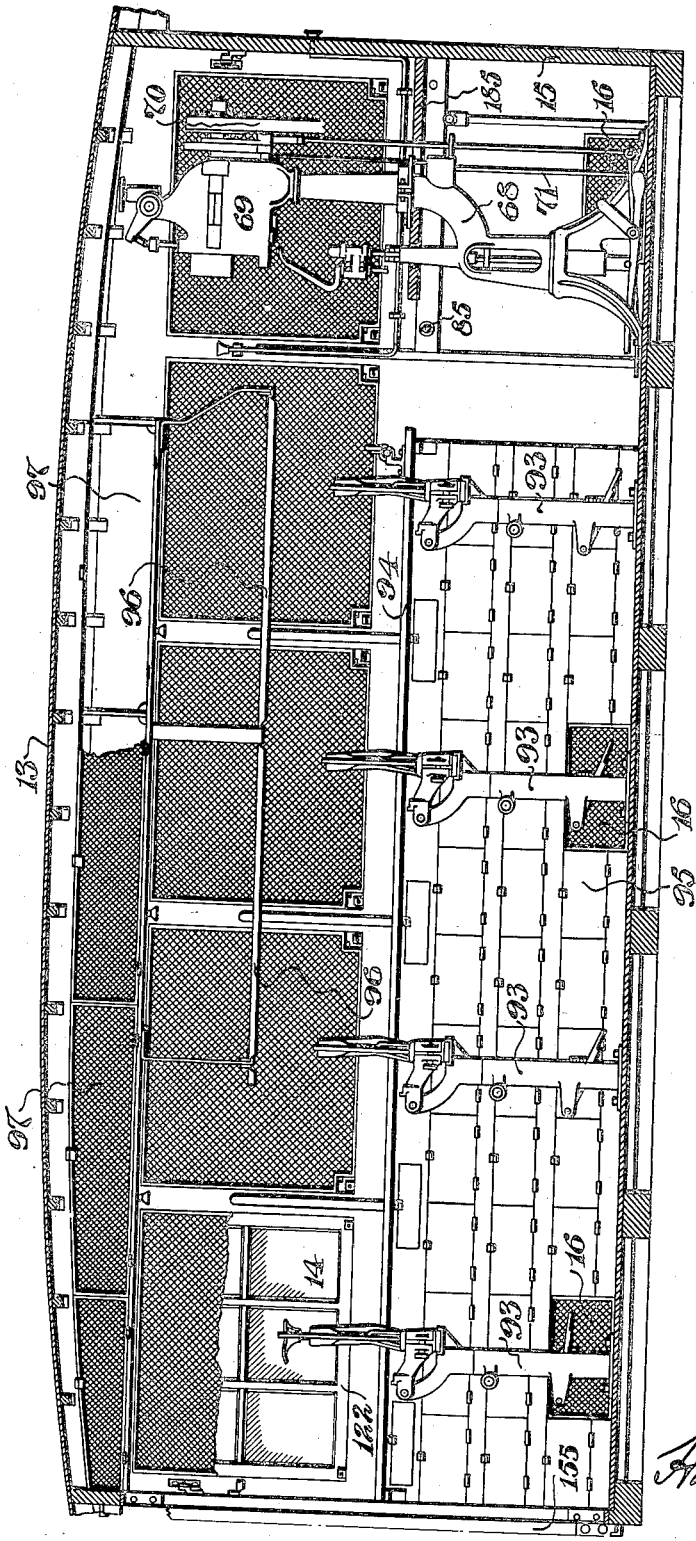

INVENTOR:
Harry N. Copp.

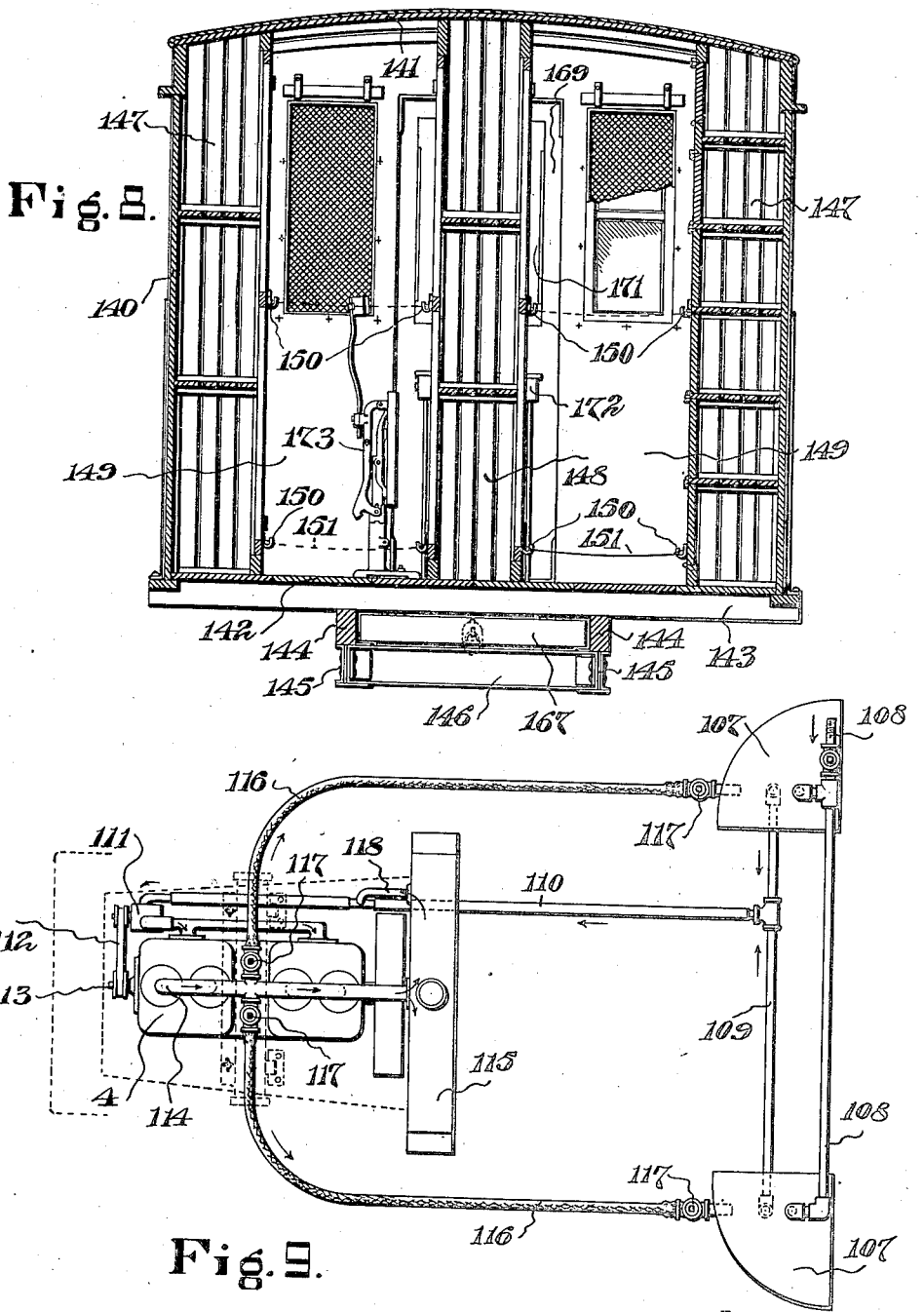

Patented Feb. 6, 1923.

1,444,025

UNITED STATES PATENT OFFICE.

HARRY N. COPP, OF SWAMPSCOTT, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

SHOE-REPAIR PLANT.

Application filed August 24, 1917. Serial No. 188,055.

*To all whom it may concern:*

Be it known that I, HARRY N. COPP, a citizen of the United States, and resident of Swampscott, in the county of Essex and State of Massachusetts, have invented certain Improvements in Shoe-Repair Plants, of which the following description, in connection with the accompanying drawings, is a specification, like reference characters on the drawings indicating like parts in the several figures.

The invention to be hereinafter described relates to shoe repair plants, and more particularly to shoe repair plants capable of being readily transported from place to place and operated in different localities to treat or repair shoes.

In communities where the facilities permit, it is the common practice to carry worn or partly worn-out boots and shoes to a cobbler or repair shop and there have the repairs made which are necessary to restore the boots and shoes to serviceable condition. Much unnecessary waste of leather and shoe materials, however, is caused by lack of repair facilities, and boots and shoes which could be rendered serviceable for a considerably longer time by renewal of worn parts or slight repairs are thrown away as useless. This condition of waste may manifest itself in any community, but is especially noticeable where by reason of the conditions under which they live, the people cannot be provided with the usual repair facilities, as for instance, an army in the field. It is not uncommon, in the instance noted, for troops to discard partly worn-out boots and shoes and require new ones every few weeks, whereas, by slight repair, if the facilities were at hand, the old or partly worn-out boots and shoes could be rendered fit for use for a much longer period of time. The waste thus caused is not only uneconomic, but, as demands for shoe materials increase, the supply of shoe materials to meet the increasing demands, is not always readily possible.

An important feature of the present invention, therefore, consists in a portable shoe repair plant comprising a motor-driven truck having a series of shoe-treating machines mounted for operation upon the truck and operable at the will of the attendant within an enclosing housing supported by the truck. One aspect of the invention with respect to this feature contemplates that the truck may be motor-propelled from place to place under control of means operable from the driver's seat, and upon arrival at a destination that the power of the motor may be shifted by means outside the housing to operate the shoe-treating machines within the housing. Motor operation of the machines within the housing, however, should be under control of a machine attendant, once the motor power is shifted to operate such machines, and another important feature of the invention consists of means within the housing operable at the will of a machine attendant to regulate the action of the motor. In this aspect of the invention, the machine attendant within the housing may regulate the speed of the motor when its power is shifted to operate the shoe treating machines, thus adapting the operations of the machines to the character of work being treated, or he may stop the motor at will when conditions observable within the housing require.

When the plant has been propelled by the motor to a desired point and the power of the motor is applied to operate the machines within the housing, the motor is liable to overheat. Another important feature of the present invention, therefore, consists of an auxiliary cooling system which is normally inoperative during transportation of the plant by the motor, but which may be rendered operative to supply additional cooling effect to the motor when the power of the motor is transferred to operate the shoe-treating machines within the housing.

In transferring the power of the motor for the operation of the shoe-treating machines after the plant has reached its destination, it is expedient that the shift may be made by the driver from the driver's seat, who will first locate the plant in proper position, and, when he becomes satisfied of this, transfer the motor power to the control of the machine attendant within the housing for use in operating the machines as dictated by the will of the attendant. In the present instance of the invention, a jack shaft takes the power from the motor when the driver shifts the power of the motor to operate the shoe-treating machines, and a line or counter shaft to which the machines within the housing may be operatively connected at will, is adapted to be actuated under control of the attendant from the jack shaft.

The portable repair plant includes as part thereof, a trailer having provisions for storing shoes either before or after treatment, and in order that the work may be readily transferred from the truck to the trailer or from the trailer to the truck without injurious exposure to weather conditions, the invention contemplates as a further feature thereof, an inclosed or vestibule connection between the truck and trailer which may be readily put in place when the plant is to be operated to treat shoes, or be removed and stored in the plant when the plant is to be transported.

The present invention also provides other features and important details and construction of parts which will be hereinafter more fully described, and these, in addition to the features hereinbefore mentioned, will be definitely set forth by the claims.

In the drawings:—

Fig. 3 shows in side elevation with parts broken away, the trailer unit of the repair plant and the detachable vestibule connection between the truck and trailer;

Fig. 4 is a longitudinal section thru the truck housing substantially on the line 4—4 of Fig. 6, looking to the right, as indicated by the arrow, Fig. 6;

Fig. 6 is a cross section thru the truck housing substantially on the line 6—6 of Fig. 4;

Fig. 8 is a cross section substantially on the line 8—8 of Fig. 3; and

Fig. 9 is a diagrammatic view showing the motor and auxiliary circulating system.

Figure 1:
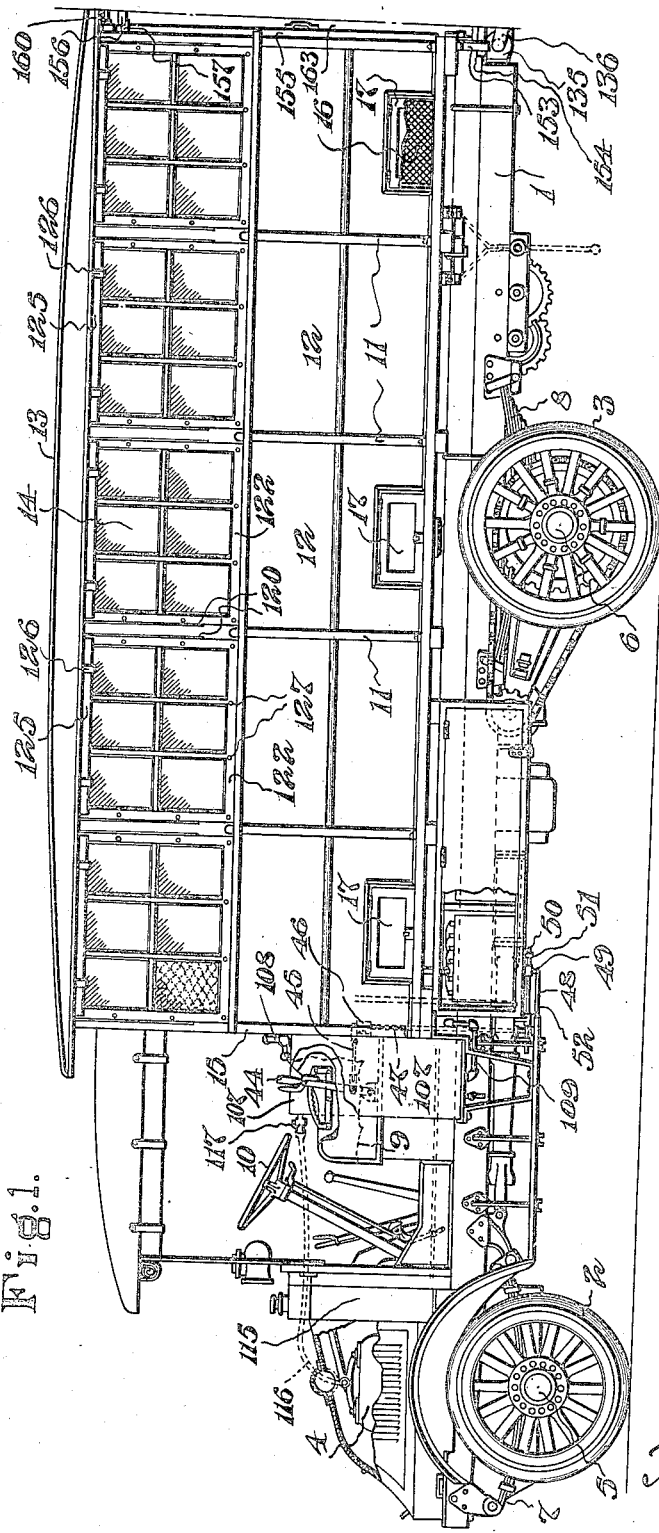
Figure 1 shows in side elevation, the truck unit of the repair plant containing the present invention.

The motor-propelled unit of the plant will be herein designated for the purposes of identification, as the truck. It comprises a suitable chassis mounted upon the usual front and rear wheels 2 and 3. The power for propelling the truck is furnished by a suitable motor 4 mounted upon the front portion of the chassis and having a train of power transmission connection to the rear wheels, all as usual in this general class of trucks. The body 1 of the chassis may be suitably supported from the front and rear axles 5 and 6 by suitable springs 7 and 8. Accessible from the driver's seat 9, as usual, is the steering wheel 10 which by suitable connection with the front axle enables the driver to direct the course of the plant while being transported from place to place. Also accessible from the driver's seat is the throttle and spark connection for the engine, as well as the transmission shift, clutch and other accessories which form a usual part of a means for controlling and transporting or propelling a power-driven truck.

Secured to and rising from the truck platform on the chassis is the housing for inclosing the machines for operating on boots and shoes. In the present instance of the invention, the housing consists of the risers 11, panels 12, roof 13 and the side windows 14, the construction being such as to provide an inclosing housing for the shoe-treating machines, to protect them effectively from the weather and provide suitably lighted and working accommodations for the machine attendants within the house.

Figure 2:
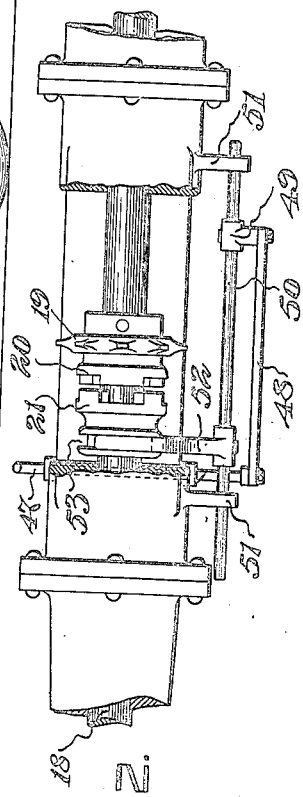
Fig. 2 is a detail on a large scale with certain parts broken away, showing one form of means for transferring the power of the motor to operate the shoe-treating machines within the housing of the truck.
Figure 5:
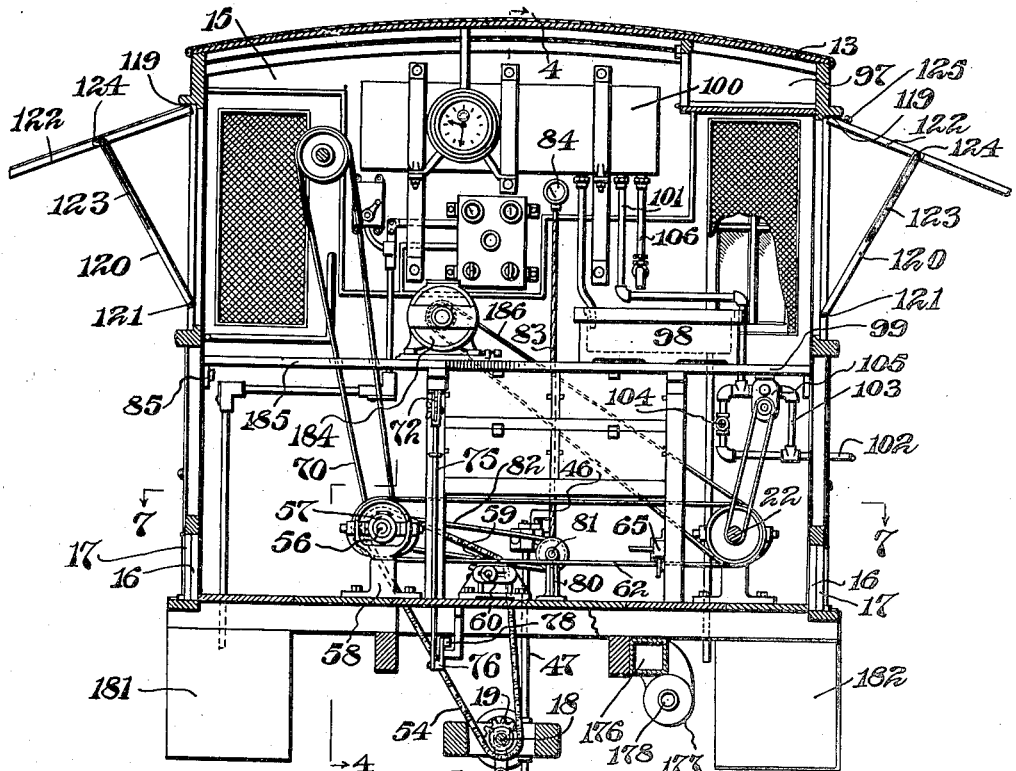
Fig. 5 is a similar longitudinal section thru the housing of the truck, on the line 4—4 of Fig. 6, looking in the direction to the left, as indicated by the arrow in Fig. 6. and in an opposite direction to that of Fig. 4.

The housing extends rearwardly from the driver's seat from which it may be preferably separated by the front wall 15 as indicated in Figs. 1 and 5, and in order to provide suitable ventilation for the housing, the lower portion thereof may be provided with a series of air inlets 16 as indicated in Figs. 1 and 5, and removable covers 17 preferably in the form of hinged doors, as indicated, may be provided for closing the ventilating openings 16, when desired. The motor shaft 18, Fig. 2, is suitably supported in bearings mounted on the chassis and extends rearwardly toward the rear axle, as usual in this class of trucks, and such motor shaft is constantly driven from the motor while the motor is in operation. The motor shaft 18, Fig. 2, has loosely mounted thereon the sprocket wheel 19, a face 20 of which constitutes one member of a clutch. Splined to the motor shaft 18 is the other member 21 of a clutch, the construction being such that when the clutch members 20 and 21 are operatively engaged, the sprocket wheel 19 will be driven by the motor.

Mounted on the truck is the line or counter shaft 22, Fig. 4, which may be supported in suitable swivel bearings 23 to accommodate itself to the changing vibrations due to the transportation of the truck over rough or uneven roads. Supported in convenient relation to the line or counter shaft 22 and within the truck housing are a series of machines for treating shoes. These may be of a type suitable for manufacture or repairing shoes, but in the present instance of the invention they are indicated as machines for repairing shoes.

Having reference more particularly to Fig. 4: There is mounted upon the standard 24 a stitcher 25 suitable for sewing the soles of shoes and usually referred to in the art as a rapid stitcher. The rapid stitcher may be operated from the line or counter shaft 22 by a belt 26 which passes around the pulley 27 connected to the rapid stitcher and a lower pulley 28 loosely mounted on the line or counter shaft 22. Connected to the line shaft 22 is a clutch which, by means of a treadle 29, Fig. 4, may be operated at will by the attendant within the housing for operatively connecting the rapid stitcher 25 to the line shaft 22. In the present form of the invention the clutch comprises the two members 30 and 31, the latter of which is fixed to the line shaft and the former of which is movable by the treadle-operated lever 29 into and out of operative relation with the fixed member 31 of the clutch.

In convenient association with the rapid stitcher is a trimmer or sole treating machine which may be of any usual character. The trimmer is preferably sustained by a standard 32 within the housing and rising from the floor thereof to support the tools 33 in appropriate position for the convenience of the attendant. The trimmer may be operatively connected to the line shaft 22 by a treadle 34, Fig. 4, the construction being such that when the attendant within the housing desires to treat a shoe by the trimmer, he will manipulate the treadle 34 and operatively connect the machine by means of the belt 35 to the line shaft.

Preferably situated on the same side of the truck within the housing as the rapid stitcher and trimmer, are the scourer, heel shaver, and other implements mounted upon a shaft 36 supported by suitable risers 37 within the housing. The scourer usually produces considerable dust and small particles of leather scraps which should be removed from the atmosphere within the housing, and to this end there is provided within the housing a fan situated within the fan casing 38, Fig. 4, and operated by a belt 39 from the shaft 36. The fan casing 38 has connected therewith an inlet 40 conveniently positioned for receiving the dust and small particles of leather, and a discharge conduit 41 communicates with the fan casing 38 and extends thru the floor of the truck as indicated in Fig. 4, for the discharge of material drawn from the tools by the fan in the fan casing. Like the rapid stitcher and trimmer, the scourer is operated by belt connection from the line shaft. In the present instance of the invention, the belt 42 connects the shaft 36 with the line shaft 22 thru a treadle-controlled clutch 43, the construction being such that any one of the machines within the housing may be selectively connected to the line shaft 22 by the attendant.

The present invention contemplates as an important feature thereof, that the power of the motor for propelling the plant from place to place may be utilized also for operating the shoe-treating machines within the housing, and to this end means are provided for selectively transferring the power of the motor to the wheels of the truck for propelling it from place to place or to the machines within the housing. Since the driver seated upon the driver's seat is to maintain traction control until the plant has reached the desired destination, it is expedient to also place within his control the means for transferring the power of the motor to the operation of the machines within the housing, so that after he has located the plant in the desired position, he may disconnect the motor from the traction mechanism and transfer it to the means for operating the machines within the housing. To this end, means are provided accessible from the driver's seat or outside of the housing for shifting the power of the motor from the traction mechanism to the means for operating the machines within the housing. This effect may be secured by variously contrived means, but in the present instance of the invention there is mounted adjacent the driver's seat a shift lever 44, Fig. 1, having a link 45 connected to a crank arm 46 extending from a shift shaft 47 which extends downwardly into convenient location near the clutch members 20, 21 hereinbefore described. To the lower end portion of the shift shaft 47, is connected a link 48 secured at 49 to a shift rod 50 which may move longitudinally in bearings 51, Fig. 2. Secured to the shift rod 50 is a yoke 52, the arms of which engage the slotted portion 53 of a collar secured to or forming part of the clutch member 21, the construction being such that by manipulation of the shift lever 44 outside the housing and preferably adjacent the driver's seat, the driver may, when he has located the plant, transfer or shift the power of the motor from its traction purpose to operate the machines within the housing. The transmission of power from the motor to the shoe treating machines within the truck housing or to the line shaft, previously described, may be variously contrived, but in the present instance of the invention the sprocket wheel 19 is engaged with a sprocket chain 54, Figs. 4 and 6, the upper run of the sprocket chain being passed over a sprocket wheel 55 secured to the jack shaft 56. The jack shaft 56 may be suitably sustained upon the truck for rotation from the motor shaft 18 thru the means described, and as shown in the present instance of the invention, the jack shaft is supported upon suitable bearings 57 rising from the standards 58 secured to the truck within the housing. The sprocket chain 54 also preferably passes over an idler, 59, Fig. 6, which may be suitably adjusted at 60 for taking up slack in the sprocket chain as desired.

Figure 7:
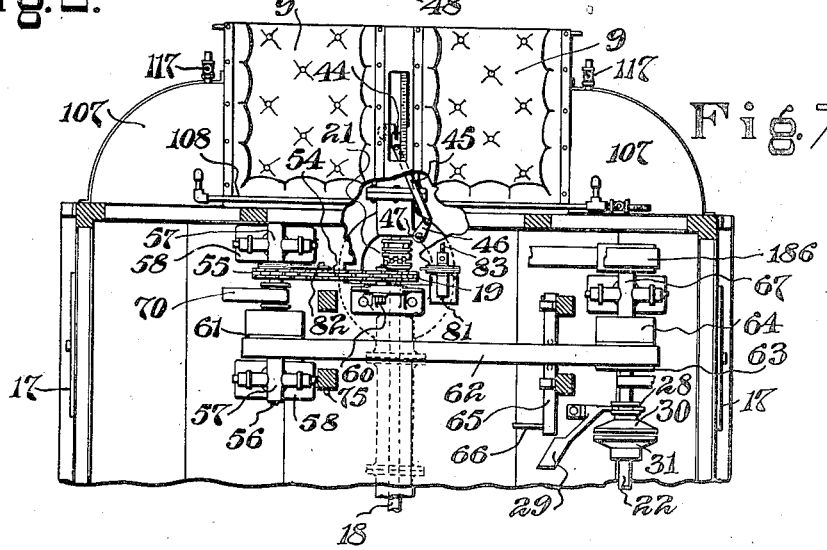
Fig. 7 is a horizontal section on the line 7—7 of Fig. 6.

Mounted on the jack shaft 56 is the belt pulley 61, Fig. 7, connected by a belt 62 with the line shaft 22. In order that the transmission of motion to the line shaft 22 may be under control of the machine attendant within the housing, the line shaft 22 has mounted thereon the fast and loose pulleys 63, 64 respectively, and a belt-shifter 65 provided with a handle 66 within the housing, enables the machine attendant within the housing to move the belt 62 onto the fast or loose pulleys 63, 64, and thereby operate the line shaft 22 or render it inoperative at will. In order that the line shaft may be properly supported, the forward end portion thereof as indicated in Fig. 7, may be sustained in a bearing 67.

Mounted preferably in the forward part of the housing is the standard 68, Fig. 5, which carries at its upper portion a metallic fastening-inserting machine 69 which in the present instance of the invention may be a loose nailer. The metallic fastening-inserting machine 69 may be driven directly from the jack shaft 56 by means of a belt 70, a treadle-controlled clutch rod 71 enabling the attendant to effect functional operation of the loose nailer at will. From the construction thus far described, it will be noted that after the driver on the driver's seat has located the repair plant in proper position, he may disengage the motor power from the traction means and transfer it thru mechanism for application in the operation of the machines within the housing. It is expedient, however, that the machine attendants within the housing may themselves have control of the motor after its power has been shifted for operation of the machines within the housing, and to this end the present invention contemplates the provision of means accessible by the attendant within the housing, for controlling the action of the motor. In the present form of the invention, a handle 72, Fig. 4, is pivotally connected at 73 to a hanger projecting from the bench or support 74 within the housing. A rod 75 extends from the end of the pivoted lever 72 downwardly to a bell crank lever 76 pivoted at 77, Fig. 4, and having one end thereof connected by a rod 78 to the motor accelerator or throttle, the construction being such that by manipulation of the hand lever 72 by a machine attendant within the truck housing, the speed of the motor and perforce the speed of the shoe treating machines within the housing, may be regulated at will. A lock 79 may be provided as indicated in Fig. 4, to lock the hand lever 72 in position when the attendant within the housing has adjusted the speed of the motor suitable to the conditions desired within the housing. A speed indicator may be employed, if desired, to indicate within the housing the speed of the motor and to this end there is mounted in suitable bearings 80, Fig. 6, a speed indicating shaft 81 belted to a jack shaft by a belt 82. Operatively connected to and rising from the speed shaft 81 is the flexible shaft 83 having at its upper portion an attached indicator 84 for indicating the number of revolutions of the motor per unit of time.

In case of accident, or on the completion of a repair job, it is contemplated that the attendant within the housing may have under his control means for stopping the motor, and to this end a switch 85, Fig. 5, is provided within the housing for manipulation by the machine attendant, to cut out the ignition system at will.

In addition to the power-operated machines within the housing, as hereinbefore described, other machines, either power-operated or manually-operated, may be provided to carry on and complete any series of operations upon shoes. In the present instance of the invention, a stitching machine 86, Fig. 4, is secured within the housing by suitable braces 87. The stitching machine 86 is generally noted in the art as a patcher, but it may be of any desired type suitable to the purpose and be treadle-operated as indicated.

The machines hereinbefore described, with the exception of the fastening-inserting machine, are preferably arranged in line at one side within the housing, and in order to provide support for the work to be treated by these machines, shelves 89, 90 and 91, Fig. 4, are supported adjacent the power-operated mechanism by suitable hangers 92.

Much of the repair work performed on boots and shoes may be carried into effect while the boot or shoe is supported upon a jack, and for economy of space within the housing, the present invention contemplates the support of a plurality of jacks preferably at the side of the truck opposite the power-operated machines. This characteristic of the invention is indicated in Fig. 5, where four jacks are supported upon uprights 93 rising from the interior floor portion of the housing. Along the side of the housing between the jacks and the wall of the housing, a work bench 94 is provided as indicated in Fig. 5, on which the work may be laid before or after being treated by the attendant on one of the jacks, and below the work bench 94, economy of space, which is requisite in a plant of this character, dictates the provision of a series of drawers or lockers 95. Above the work bench 94 are the hanging shelves 96 and above the hanging shelves convenient storage lockers 97 are provided.

The treatment or repair of boots and shoes frequently requires that portions of boots or shoes can be tempered or softened by moisture. A tempering trough 98, Fig. 6, is supported on a shelf or bench 99 within the housing adjacent the rapid stitcher. Secured in appropriate position to supply moisture to the tempering trough is a tank 100, Fig. 6, to which is connected a supply pipe 101. The supply pipe 101 is connected to a pipe 102 directly and also by means of a bypass. Direct connection between the pipe 101 and pipe 102 is thru the pipe 103, and the bypass connection is thru the valve 104, the construction being such that when desired, water may be drawn from a low head by means of a water pump 105 thru the pipe 102 and forced by the pump thru the supply pipe 101 into the tank 100, or by opening the bypass 104 water may be forced to the pipe 102 thru the bypass into the tank 100. A suitable opening 106, Fig. 6, from the tank, may supply water to the tempering trough 98.

When the power of the motor is being applied for traction purposes, the usual cooling system for the motor is sufficient to keep the motor in cooled and working condition; but when the plant has been transported to the position for use of the shoe-treating machines, and the power of the engine is shifted to operate these machines, the usual cooling system is not adequate and the engine is liable to become overheated. The invention, therefore, contemplates the provision of an auxiliary or additional cooling system which may be rendered operative when the plant has reached its point of destination and power is transferred from the motor to the machines within the housing. This feature of the invention may be variously contrived, but in the present instance it comprises the auxiliary tanks 107 preferably one at each side of the driver's seat as indicated in Figs. 1 and 7, which tanks are provided with a supply inlet 108 and circulating connections with the main circulating system.

Extending from the bottom or lower portion of each auxiliary supply tank 107, is a pipe 109, Fig. 9, in communicating relation with a pipe 110 leading to the circulating pump 111, the construction being such that as the circulating pump is operated by the usual belt connection 112 with the motor shaft 113, the cooling fluid furnished by the auxiliary tanks may be drawn by the pump and forced thru the water jackets surrounding the cylinders, as usual. Connected to the pipe 114 is the main radiator 115 by which the heated liquid may be cooled as usual in this class of machines. Extending from the circulating pipe 114 at each side thereof is an auxiliary return pipe 116 each of which leads to one of the tanks 107 as indicated in Fig. 9. The return pipes 116 each are provided with a valve or valves 117 which may be opened or closed at will. When the plant is being transported and consequently the engine is being used for traction purposes, the circulating pipes 116 may either be removed from their connections with the tanks 107 and the valves closed, or they may remain in place as indicated in Fig. 9 and the valves 117 closed to interrupt the flow thru said auxiliary circulating pipe 116. Connecting the radiator 115 with the pipe 110 is a pipe 118 whereby the liquid, after passing into the radiator, may be drawn by the pump back thru the circulating system.

The truck housing is provided with side windows, the sashes of which are preferably hinged at their top end portions as indicated at 119, Fig. 6, and the supports 120 pivoted at 121 to the housing, afford support for holding the windows 122 in open position as indicated in Fig. 6. The supports 120 are preferably provided with slots 123 in which are adapted to travel pins 124, projecting from the sides of each sash. The awnings, such as indicated at 125, Fig. 6, may afford protection to the attendants within the housing when weather conditions render such protection desirable. These awnings are preferably rolled up as indicated in Fig. 1 when not in use, and held by straps 126 and when upstrapped and let down over the window sashes 122, the awnings may be secured to the sashes by usual turn-button clips 127 as indicated in Fig. 1.

As a part of the repair plant, a trailer is provided. This comprises a floor-supporting portion for a housing mounted upon wheels for transportation with the truck. In the present instance of the invention the trailer is mounted upon front and rear wheels 128 and 129, Fig. 3, the main supporting frame of the trailer being supported from the axles by suitable springs 131. The trailer is provided with a fifth wheel 132 which, by means of a tongue 133 is connected to the truck. In the present form of the invention, the truck is provided with a draw-bar 134, Fig. 4, having an eye end portion 135 for engagement with the end 136 of the trailer tongue. The draw-bar 134 passes thru a cross member 137, Fig. 4, and is supplied with an end nut 138 between which and the cross member 137 is a heavy coil spring 139, the construction being such as to yieldingly pull the trailer as the truck is propelled by the motor.

The trailer, which is generally indicated in Fig. 3, is provided with a housing 140, Figs. 3 and 8, and an inclosing roof 141. The floor 142 of the trailer is supported upon the cross beams 143 which are themselves properly supported by longitudinal girders or members 144 extending lengthwise of the trailer. The members 144 of the trailer are sustained upon a metal body frame comprising longitudinal members 145 and the cross members 146

Within the housing of the trailer there are provided storage lockers 147 extending along each side and longitudinally of the trailer, and between the side storage lockers 147 is a storage receptacle 148 which extends longitudinally of the trailer but stops short of each end thereof to provide a passageway about each end of the storage locker 148. The storage lockers 147 and 148 are thus arranged to provide a side passage 149 at each side of the central storage locker 148. Suspending hooks or hangers 150 are provided at suitable points in the passageways 149 to support a canvas cot 151, the construction being such that while the side and central lockers provide free passageway for the proper handling of goods to be stored in or taken from the trailer, the side passageways also provide proper sleeping accommodation for the crew.

The shoe to be treated by the machines in the housing of the truck and those that have been treated by such machines, will ordinarily be stored in the lockers of the trailer. It becomes necessary, therefore, when the truck and trailer have been transported to the place for operation of the shoe-treating machines, that the truck and trailer be suitably connected for the transfer of the shoes between the truck and trailer. To this end, the present invention contemplates the provision of a detachable vestibule between the front end of the trailer and the rear end of the truck. In the present instance of the invention the vestibule consists of the cross-bars 152 which extend between the truck and trailer and the ends of which may be detachably connected to each. As shown, the rear end of the truck and the front end of the trailer are each provided with a series of hangers or stirrups 153, Figs. 1 and 3, in which the ends of the cross-bars 152 may rest. There may be a series of these cross-bars sufficient in number to support the deck or flooring 154 which bridges the space between the truck and trailer.

The rear end of the truck and the front end of the trailer are each provided with a sliding door 155 so that ready passage between the truck and trailer is established.

It is expedient that the work to be treated be protected from weather conditions as it is being transferred between the truck and trailer, and to this end the present invention contemplates completion of the vestibule or passageway between the truck and trailer by enclosing the top and sides so that the work may be transported between the truck and trailer without exposure to the weather. In the present instance of the invention the roof portion of the vestibule consists of the roof bars 156, Fig. 3, the ends of which rest in sockets 157 secured respectively to the rear end of the truck and the front end of the trailer. The roof bars 156 are preferably formed of pieces adjustably connected together as for instance by the adjusting screws 158, Fig. 3.

Extending transversely across the roof bars 156 is the cross-bar 159. The roof may be formed of any suitable material adapted to be supported by the roof-bars hereinbefore described, but in the present instance of the invention, the roof is formed of waterproof material such as canvas 160, the end portions of which are connected by the hooks 161, Fig. 3, to the truck and the trailer underneath the overhangs 162. The side walls of the vestibule may be also formed of the canvas flaps 163 and these may be either detachably secured to the edge portions of the roof of the vestibule or may be formed integral therewith. In the present instance of the invention the side walls 163 are formed of canvas of a waterproof character, and are split as indicated by dotted lines in Fig. 3 at 164. A raising cord 165 serves to close the edges of the flap. If desired, and when weather conditions permit, the flaps of the side walls may be pulled back as indicated by diverging dotted lines, Fig. 3, and held in desired position by straps 166, the construction being such that when the weather conditions require, the work may be transported between the truck and trailer without exposure to the weather, which might injure the materials and when weather conditions permit, the side walls of the flap of the vestibule may be opened up to permit free air circulation.

The vestibule connection between the truck and trailer is employed only when the truck and trailer have been moved to the predetermined position where the shoe-treating machines are to be operated so that during transportation the detachable vestibule may be stored away and in the present instance of the invention, the storage space between the longitudinal girders 144, Fig. 8, above the rectangular frame 145, 146 is utilized for this purpose, and the front and rear ends of the storage space may be closed as by a door 167, Fig. 8.

It may be convenient at times to enter the vestibule between the truck and trailer without passing thru either, and to this end a detachable step or ladder 168, Fig. 3, of appropriate character, may be employed to engage the side portion of the vestibule and permit entrance between the flaps of the side wall.

The rear end of the trailer is provided with a door 169, Figs. 3 and 8, and a temporary step or ladder 170 permits ingress and egress to the trailer thru the rear door.

The rear end wall of the trailer may likewise be provided with swinging window sashes 171, substantially similar to the swinging sashes already described for the truck, and in the space between the rear end of the central storage locker 148 and the rear end of the trailer there may be provided a table or other convenient means for enabling records being made of the work done, or that brought to or taken from the storage trailer, and in the present instance of the invention this table is indicated as 172. Adjacent the table is a folding chair 173, Fig. 3. Suitable ventilating openings 174 may be provided in the side walls of the trailer housing.

The weather conditions may require from time to time that the interior of the truck housing be suitably heated to enable the machine attendents to operate the machines, and in the present instance of the invention this is effected by means of a heat conduit leading from a part of the engine exhaust or muffler into the housing. The floor of the housing is provided with an opening 175, Fig. 4, thru which extends the heat flue 176 leading to a casing 177, Figs. 4 and 6, which surrounds the muffler 178, the construction being such that air may pass into the front end 179, Fig. 4, of the casing and between it and the muffler and there become suitably heated for transfer to the interior of the housing. The opening 175 in the floor of the housing may be valve controlled as indicated at 180, so that the attendant within the housing may regulate the flow of heat thereto at will.

The truck may be provided with suitable storage chests or bins, at the sides and below the floor of the housing as indicated at 181, 182, Fig. 6. These storage bins or receptacles may serve for storage batteries and for tools and other implements that may be needed. Likewise, the trailer may have secured thereto below the housing floor, the storage chests or bins 183, and suitable doors may be provided for closing such storage bins or chests.

To provide lighting facilities within the housing of the truck and enable the attendants to operate the machines at night, if desired, a generator 184, Fig. 6, is mounted within the housing on the shelf or support 185, and is operated by a belt 186 driven from the line shaft 22. Usual conductors and switch-board connections may be associated with the generator 184 to effect proper distribution of the electric currents, part of which may be utilized as indicated at 187, Fig. 4, for heating the wax-pot of the rapid stitcher 25. The detail features of the generator, the electric lighting and heating systems, may be of any usual or preferred type, and being well known in the art, need not be here further described.

What is claimed is:—

1. A portable shoe repairing plant, comprising, in combination, a truck, a motor, a series of shoe treating machines mounted on the truck, a housing inclosing the series of shoe treating machines, means for selectively applying the power of the motor for transporting the truck and operating the shoe treating machines, and means under control of a machine attendant within the housing for regulating the speed of the motor when its power is directed to operate the series of shoe treating machines.

2. A portable shoe treating plant, comprising, in combination, a motor driven truck provided with a housing, a series of shoe treating machines mounted on the truck within the housing, and means controlled by an attendant within the housing for operating the machines from the motor.

3. A portable shoe repair plant, comprising, in combination, a truck provided with a housing, a motor, a trailer connected to and movable with the truck for transporting shoes, a series of shoe treating machines mounted on the truck within the housing, a transferring platform between the truck and trailer permitting transfer of shoes between the truck and trailer, and means within the housing under control of the attendant for the shoe treating machines for operating the machines from the motor.

4. In a portable shoe repair plant, the combination of a truck, a motor thereon, a series of shoe treating machines mounted for operation on the truck, a counter shaft mounted on the truck, means operable from the driver's seat for selectively applying the power of the motor to the transportation of the truck and operation of the counter shaft, a housing inclosing the series of machines, means under control of a machine attendant within the housing for regulating the speed at which the counter shaft shall be driven from the motor, and means for selectively operating any of said machines from the counter shaft at the will of the attendant within the housing.

5. In a portable shoe repair plant, the combination of a truck having a housing, a series of shoe treating machines mounted for operation upon the truck within the housing, a motor, means outside the housing for controlling the transportation of the truck by the motor, means outside the housing for transferring the power of the motor to operate the series of shoe treating machines within the housing, and means within the housing for regulating the motor at the will of a machine attendant within the housing after the power of the motor has been applied by the means outside the housing to operate the machines within the housing.

6. A portable shoe repair plant, comprising, in combination, a truck, a motor, a housing carried by the truck, a series of shoe treating machines mounted on the truck within the housing, a jack shaft for transferring the power of the motor to operate the machines within the housing, means outside the housing for selectively applying the power of the motor to transport the truck or to operate the jack shaft, operating connections between the jack shaft and shoe treating machines within the housing, and means within the housing under control of a machine attendant for rendering said connections operative or inoperative at will when the power of the motor has been applied to the jack shaft by the means outside the housing.

7. A portable shoe repair plant, comprising, in combination, a truck, a motor, a housing carried by the motor, a series of shoe treating machines mounted on the truck within the housing, a jack shaft for transferring the power of the motor to operate the machines within the housing, means outside the housing for selectively applying the power of the motor to transport the truck or to operate the jack shaft, operating connections between the jack shaft and shoe treating machines within the housing, means within the housing for regulating the speed at which the jack shaft shall be driven from the motor, and means within the housing under control of a machine attendant for rendering said connections operative or inoperative at will when the power of the motor has been applied to the jack shaft by the means outside the housing.

8. In a portable shoe repair plant, the combination of a truck, a motor, a series of shoe treating machines mounted for operation on the truck, a housing for inclosing the series of machines, a jack shaft, means outside the housing for selectively applying the power of the motor to propel the truck or to operate the jack shaft, a line shaft extending longitudinally of the truck, means for operating the line shaft from the jack shaft, means for operatively connecting the shoe treating machines to the line shaft, and means under control of a machine attendant within the housing for regulating the action of the motor when its power is applied to the jack shaft.

9. In a portable shoe repair plant, the combination of a truck, a series of machines for treating shoes mounted for operation upon the truck, a housing inclosing the shoe treating machines, a motor, a jack shaft within the housing, means operable from the driver's seat for applying the power of the motor to transport the truck or drive the jack shaft, a line shaft adapted to be operatively connected to the shoe treating machines, means for connecting the jack shaft and line shaft, and means under control of the attendant within the housing for rendering said connecting means operative or inoperative at will.

10. In an apparatus of the class described, the combination of a truck, a series of machines for treating shoes mounted for operation on the truck, a housing inclosing the shoe treating machines, a motor, a jack shaft, means operable from the driver's seat for selectively applying the power of the motor to transport the truck or operate the jack shaft, a line shaft, means under control of a machine attendant within the housing for operatively connecting the jack shaft and line shaft, and means under control of the machine attendant within the housing for regulating the speed of the jack shaft when the motor power is applied thereto.

11. A portable shoe repair plant, comprising, in combination, a truck, a series of shoe treating machines mounted for operation on the truck, a motor for selectively driving the truck and operating the machines, a trailer connected to the truck to be transported therewith for carrying the shoes, an enclosed platform between the truck and trailer for transferring the shoes between the trailer and truck before and after treatment, and means for detachably securing the enclosed platform to the truck and trailer permitting ready removal when the truck and trailer are to be transported and establishing connection between the truck and trailer while the machines are operated for treating shoes.

12. In an apparatus of the class described, the combination of a truck and connected trailer, a series of shoe treating machines mounted on the truck and storage receptacles mounted on the trailer for shoes treated by machines mounted on the truck, the said truck and trailer being provided with protecting housings, a platform adapted to extend between the rear end of the truck and front end of the trailer, means for detachably securing the ends of the platform to the truck and trailer, and an inclosing connection between the truck and trailer for inclosing the platform between the truck and trailer for the protection of work as it is transported between the truck and trailer.

13. In an apparatus of the class described, the combination of a truck, shoe treating machines mounted for operation upon the truck, a motor, a trailer connected to the truck for transportation therewith, means for selectively transporting the truck and trailer and operating the machines from the motor, and means for establishing communicating connection between the truck and trailer when they are at rest and for interrupting such communication when they are being transported by the motor.

14. In an apparatus of the class described, the combination of a truck, shoe treating machines mounted for operation upon the truck, a motor, a trailer connected to the truck for transportation therewith, means for selectively transporting the truck and trailer and operating the machines from the motor, a detachable platform adapted to extend between the rear end of the truck and front end of the trailer when the truck and trailer are not being transported by the motor, and a storage receptacle beneath the floor of the trailer for carrying the detachable platform when the truck and trailer are being transported.

15. A portable shoe treating plant, comprising, in combination, a portable truck and connected storage trailer, machines mounted for operation upon the truck, connections between the trailer and truck permitting the transfer of work treated by the machines between the two, said trailer having a rear door for the reception and shipment of work.

16. A portable plant of the class described, comprising, in combination, a motor-driven truck, a storage trailer connected for traction with the truck and having a rear entrance for the reception and discharge of work, and a detachable connection between the truck and trailer for the transfer of work between the trailer and truck.

17. A portable shoe treating plant, comprising, in combination, a motor driven truck provided with a housing, a series of shoe treating machines and a shoe tempering trough mounted upon the truck within the housing, a supply tank mounted upon the truck for supplying liquid to the tempering trough, means controlled by the attendant within the housing for operating the shoe treating machines from the motor, and a pump mounted on the truck and operated by the motor for supplying liquid to the supply tank.

18. A portable shoe treating plant, comprising, in combination, a truck provided with a housing, a motor, a series of shoe treating machines mounted upon the truck within the housing for treating shoes while in temper, a tempering trough and supply tank mounted on the truck, a pump for supplying the tank, and means actuated by the motor for operating the machines and pumps.

19. In a portable shoe repair plant, the combination of a truck having a housing, a motor for transporting the truck and controlled from the driver's seat outside the housing, a series of shoe treating machines within the housing, a jack-shaft, means controlled from the driver's seat outside the housing for operatively connecting the motor with the jack-shaft when the truck is at rest, independent means within the housing for operatively connecting the jack-shaft and shoe treating machines at will, and means within the housing for controlling the action of the motor.

20. In a portable shoe repair plant, the combination of a truck having a housing, a motor, a shaft for conveying motion from the motor for transporting the truck, means operable from the driver's seat for controlling the motor and its transmission of power for transporting the truck, a jack-shaft, a series of shoe treating machines within the housing adapted to be driven from the jack-shaft at will, connections between the motion conveying shaft and jack-shaft including a clutch, means independent of the motor controlling means operable from the driver's seat for controlling the clutch, and means within the housing for regulating the action of the motor after the said clutch has been rendered effective for transmitting motion to the jack-shaft.

In testimony whereof I have signed my name to this specification.

HARRY N. COPP.